April 26, 1966  A. A. NAUJOKAS  3,248,460
METHOD OF MAKING LENSES
Filed Feb. 28, 1963
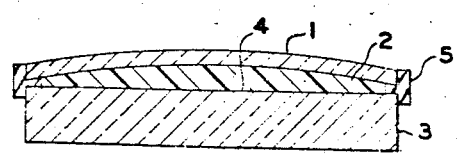
FIG. 1
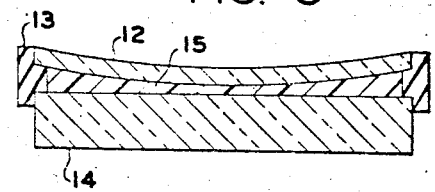
FIG. 5
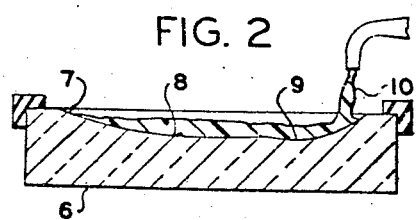
FIG. 2
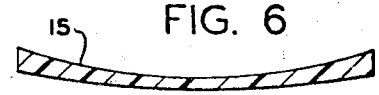
FIG. 6
FIG. 8
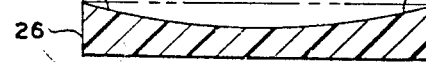
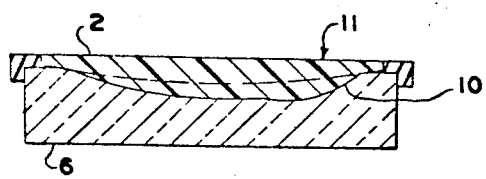
FIG. 3
FIG. 4
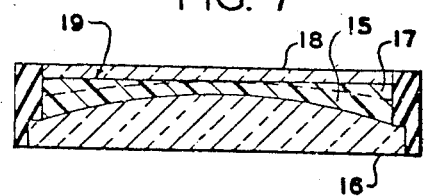
FIG. 7
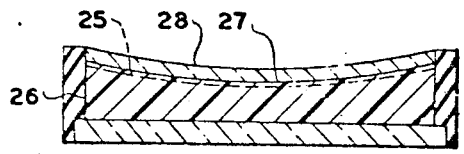
FIG. 9
INVENTOR.
ANDRIUS A. NAUJOKAS
BY
ATTORNEYS United States Patent Office 3,248,460
Patented Apr. 26, 1966

3,248,460
METHOD OF MAKING LENSES
Andrius A. Naujokas, Rochester, N.Y., assignor to Bausch & Lomb Incorporated, Rochester, N.Y., a corporation of New York
Filed Feb. 28, 1963, Ser. No. 261,582
4 Claims. (Cl. 264—1)

This invention relates to a method of making lenses and more particularly a method of casting a second lens integral with a base lens.

The casting of plastic lenses creates internal stresses due to the inherent shrinkage of plastics. The plastic lenses may be made of a variety of compositions the more common being CR-39 which is a tradename for a monomer in liquid form of a diethylene glycol-bis-allylcarbonate. Other examples of compositions being allylic esters such as triallyl cyanurate, triallyl phosphate, triallyl citrate, diallylphenylphosphonate, acrylic esters, methyl methacrylate, allyl methacrylate, butyl methacrylate and polyester such as EGM formed of ethylene glycol maleate which are merely illustrative but not limitive of compositions used. These compositions form plastics which may be adapted to the art of plastic lens making. As mentioned previously the shrinkage caused during the curing of these lenses which is approximately 15% creates internal stresses in the lens. Where a lens of high power is cast the stress becomes so great that the lens cannot be removed from the mold without breakage or surface defects. Lenses of slightly less curvature produce a low yield and therefore it is often not feasible to produce a lens of this type through a single operation casting process.

A further problem in the casting of this type of a lens is encountered where a lens of this type is to be used for an ophthalmic purpose. Where the lens carries a high diopter curvature, lenticular bi-focal, or toric curvature, extensive grinding of plastic lenses is impractical and a combination of all necessary curvatures to fulfill prescriptions needed would require, a large number of lenses to be carried in stock. Accordingly this invention permits stocking only a lens carrying a base curve of low diopter curvature upon which may be cast the bi-focal and/or lenticular and cylinder curvatures to produce the desired prescription. The bi-focal curvatures are cast integral on the base curve lens to produce a finished lens blank of the desired overall curvatures.

In a high negative lens the distortion and internal stress are so great it is not feasible to cast in a single operation. A base curve lens is used upon which an additional curvature is added to the overall composite curvatures of the lens to produce a lens which is practical to cast and provides a lens which is castable to the desired prescription.

It is an object of this invention to provide a method for casting a lens.

It is another object of this invention to provide a two step process for casting a thermosetting or thermoplastic plastic lens.

It is a further object of this invention to subsequently form at least one surface on a lens portion while integrally casting a lens portion on a base lens.

The objects of this invention are accomplished by molding or casting base lenses having a common base curve preferably of low diopter curvature. These base lenses are then used to receive a second lens curvature by addition of added lens material which is cast integral with the base lens. The second mold would carry a diopter curvature which would increase the power of the lens. Due to the inherent shrinkage of plastics upon polymerization the internal stress within the lens is reduced due to the double casting method. In event of a high negative lens the peripheral portion being of greater thickness tends to shrink and displace the center portion axially relative to the peripheral portion of the lens. This distortion creates breakage and/or surface defects due to premature separation from mold if the lens is cast in a single operation. By double casting the final shape of the lens may be more uniformly controlled and also the lens may be cast without surface defects, or creating breakage or internal stress above the tolerance permitted in a lens of this type.

The casting of the bi-focal and/or lenticular prescription on a plastic lens provides the manufacturer a means of molding an optical surface of a desired two diopter curvature lens and yet maintains the inventory of lens blanks to a minimum.

The preferred embodiments of this invention are disclosed in the attached drawings.

FIG. 1 illustrates the casting of a base lens.

FIG. 2 illustrates placing a fluent mass of thermosetting plastic in a second mold.

FIG. 3 illustrates the casting of the composite lens with the base lens as a mold cover.

FIG. 4 illustrates the composite lens where the two lenses are formed integral.

FIG. 5 illustrates the initial casting of a negative base lens.

FIG. 6 illustrates a negative lens slightly distorted due to shrinkage caused by the curing of the plastic.

FIG. 7 illustrates the final mold of the lens portion on the base lens.

FIG. 8 illustrates an alternate way of forming the base lens element.

FIG. 9 illustrates a surface finishing step by casting.

Referring to the drawings a method of casting a composite lens is illustrated. The methods provide a means for reducing breakage, resurfacing lens having surface defects, and increasing yield of lenses having uneven thicknesses. The greater the power the greater the variation in thickness thereby causing a greater danger of breakage during casting and removal of lens from the mold. The molds as shown have a finished surface capable of imparting to the lens a surface of image transmitting quality.

FIG. 1 illustrates the casting of the base lens which carries a surface curvature of low diopter. The lens might be positive or negative depending upon which type of lens which is subsequently to be cast in the composite lens. One surface is generally a planar surface although concave or convex surfaces might be equally well adapted for casting in the base lens. The mold illustrated in FIG. 1 includes a flexible hardened mold element 1 having a surface finish engaging the lens 2 which is capable of image transmitting quality. The second mold element 3 carries a hardened surface 4 capable of providing an image transmitting quality on the surface of the lens 2. A flexible gasket 5 is placed around the outer periphery of the mold elements 1 and 3. The flexible gasket 5 may be displaced slightly to permit injection of a plastic forming the lens 2. The lens is then permitted to harden and is removed subsequently to complete curing.

FIG. 2 illustrates a mold element 6 forming a mold cavity 7. The mold cavity 7 has a double curvature 8 and 9 for forming a lenticular bi-focal lens surface. The lens forming material 10 is placed within the mold cavity 7. The base lens 2 is then placed over the mold 6 and excess portions of the material 10 is forced out of the mold cavity 7 to form an intimate bonding interface between the material 10 and the base lens 2. As the material 10 is allowed to cure an integral composite lens 11 is formed. Upon complete curing of the composite lens the lens is removed from the mold and has formed the shape as illustrated in FIG. 4. The double curvatures 8 and 9 received from a mold 6 is formed on the composite lens 11. The composite lens is an integral structure having image transmitting quality major surfaces which may be edged to a suitable configuration to adapt it to the proper supporting structure for the lens as it is used.

FIG. 5 illustrates the initial step in the casting of a high power negative lens. A flexible hardened element 12 is positioned on the upper portion of the flexible gasket 13. The lower mold element 14 forms the lower portion of the mold. The flexible gasket 13 is positioned about the outer periphery of the mold elements 12 and 14. The gasket is displaced slightly on the upper edge to permit injection of plastic material which forms the base lens 15. Subsequent to curing, the lens 15 is removed and is shown in FIG. 6. The peripheral edges are thicker than the center portion and therefore shrink a greater axial dimension than the center portion. A radial shrinkage is also encountered which causes the peripheral edges to move axially relative to the center portion of the lens. This forms a slight curvature on the initially planar surface of the lens causing a slight convex curvature on the one surface of the lens, and accentuating the concave curvature of the other major surface of the lens. If the overall thickness of the lens, and the variation in thickness of this lens is not too great it is possible to mold a lens as illustrated. If a greater curvature than that molded in the base lens is desired then additional casting is necessary. This additional step is illustrated in FIG. 7.

The lens element 15 is positioned in the mold 16. A portion of lens forming material 17 is then deposited on the upper surface of the preformed lens 15. A sufficient quantity must be added to completely cover the surface of the lens and then a mold element 18 is positioned on top of the fluent mass of material. The fluent mass of material 17 is then permitted to cure to form a composite lens 19. The composite lens is removed from the mold subsequent to its curing.

A negative lens is illustrated in FIGS. 5, 6 and 7 because a negative lens due to its particular shape encounters greater distortion due to shrinkage as it cures. A positive lens might also be cast in a manner as illustrated as a two step operation might be advantageous in this type of a lens as well. The greater the power the greater the stress set up in the lens and likewise the greater need for a two step operation.

The description in the preceding paragraphs refers to a two step casting operation. It is understood while a two step casting operation is illustrated and described the inventor does not wish to limit the first step to a casting of the lens element. The making of the base lens might be accomplished in any manner to arrive at the desired shape for the lens element. In other words elements stamped from a sheet having parallel surfaces could provide a base lens upon which an additional portion of lens forming material might be cast. The base lens provides a reinforcing base for the composite lens which reduces breakage and eliminates the overall stress in the composite lens. It is also possible that these elements might be made of elements having parallel major surfaces which are subsequently ground, or ground and polished to provide the desired surface curvatures.

The lens making process is helpful in recovering lens elements which have damaged surfaces. The process provides a means which is economically more feasible than polishing a lens with a surface having a major defect. In event that the additional lens forming material is used to resurface a surface having unevenness on the surface of a marked degree of irregularity then the base lens and the additional lens forming material should be of the same refractive index. In event that the resurfacing is primarily intended to give a surface hardening and is formed of a dissimilar material then a polishing operation prior to resurfacing improves the optical qualities as the refractive indexes are dissimilar.

The description covering FIG. 9 refers to a resurfacing operation which may be used to improved the surface quality or provide a desired surface characteristic for the composite lens. FIG. 8 illustrates a lens element of generally circular configuration and having two planar major surfaces. The surface 25 is indicated as a ground surface but may be formed by any means to provide the desired curvature. This type of a base lens has a minimum of stress created in the base lens. By casting a lens of equal thickness over the major surface of the lens, the inherent stress due to shrinkage will be minimized. This type of a base lens need not be finished to any precise degree of image transmitting quality as a subsequent surfacing operation will provide the desired surface characteristic and hardness as well as refracting index.

FIG. 9 illustrates the final casting operation where a single surface is cast on one of the major surfaces of the base lens 26. The material 27 is deposited on the surface 25 while in a fluent state. The flexible element 28 is then pressed onto the fluent mass 27 of lens forming material. Any excess material is extruded around the periphery of the mold element 28. The fluent mass 27 is then allowed to cure which forms an intimate binding between the interfaces of the material 27 and the lens 26. Either or both surfaces of the composite lens might be made by a final casting operation as illustrated. By casting a thin surface having the desired optical qualities any finish or lens characteristic may be imparted to the base lens to form a composite lens.

Referring to FIGS. 1–4 the casting operation includes the following steps. A base lens is made in a lens mold as illustrated. Subsequent to curing of the lens the base lens is then removed from the mold.

A second mold having a mold element carrying the desired curvature is then filled with lens forming material. The base lens is then placed on the lens mold and any excess lens forming material is extruded from a lens cavity. The composite lens is then permitted to cure to form integrally the lens forming material with the base lens. Subsequent to curing of the composite lens the composite lens is removed from the mold. In this manner the internal stress is reduced very substantially permitting casting of a lens with minimum stress and facilitating the removal of the composite lens from the lens mold.

The drawings and the description illustrate the preferred embodiments of this invention. Other modifications might be devised which would fall within the scope of the invention which is defined by the attached claims.

I claim:

1. The method of forming composite bifocal lens of substantial power comprising, casting a base lens of a plastic material having limited curvatures on the major surfaces of the lens to produce approximately half of the predetermined power desired in the composite lens, casting a lens portion of additional plastic material integral with the base lens to form a composite lens of substantially greater power than the base lens, simultaneously forming a plural curvature surface on one of the major surfaces of said composite lens of image transmitting quality to thereby provide a composite bifocal lens.

2. The method of making a hardened lens comprising, casting a base lens of a thermosetting synthetic resin having limited curvature on the major surfaces of the lens and producing a lens of limited power, casting a lens portion integral with said base lens of additional thermosetting synthetic resin to form a composite lens of substantially greater power than the base lens, subsequently casting at least one major surface on said composite lens of a surface hardening material integral with said composite lens and forming a hardened composite lens to thereby provide a composite lens having at least one hardened major surface of image transmitting quality.

3. The method of forming a composite lens of high magnification comprising, casting a base lens of thermosetting synthetic resin having the power of approximately half the predetermined power desired in the composite lens, allowing the thermosetting material to set and form a base lens, placing the base lens on an additional quantity of thermosetting synthetic resin in a mold to integrally cast said additional resin in a composite lens with said base lens of substantially greater power than the base lens and provide a composite lens of substantially greater power than castable by a single casting operation.

4. A method of forming a composite negative lens having a substantial curvature on the major surfaces, casting a base lens of a thermosetting synthetic resin of approximately half the power desired in the composite lens, casting an approximately equal quantity of additional thermosetting synthetic resin integrally with the base lens to substantially increase the curvature of at least one of the surfaces of said lens and thereby provide a composite negative lens of substantially greater curvature on at least one of the major surfaces.

References Cited by the Examiner
UNITED STATES PATENTS

| | | | |
|---|---|---|---|
| 2,339,433 | 1/1944 | Staehle | 264—1 |
| 3,031,927 | 5/1962 | Wesley | 88—54.5 |
| 3,037,425 | 6/1962 | De Carle | 88—54.5 |

ALEXANDER H. BRODMERKEL, Primary Examiner.

J. R. DUNCAN, B. SNYDER, Assistant Examiners.